Jan. 24, 1933.                H. W. BELL                1,894,973
FLEXIBLE CONNECTION
Original Filed March 27, 1926    4 Sheets-Sheet 1

INVENTOR.
Harvey W. Bell
BY Moses & Nolte
ATTORNEYS.

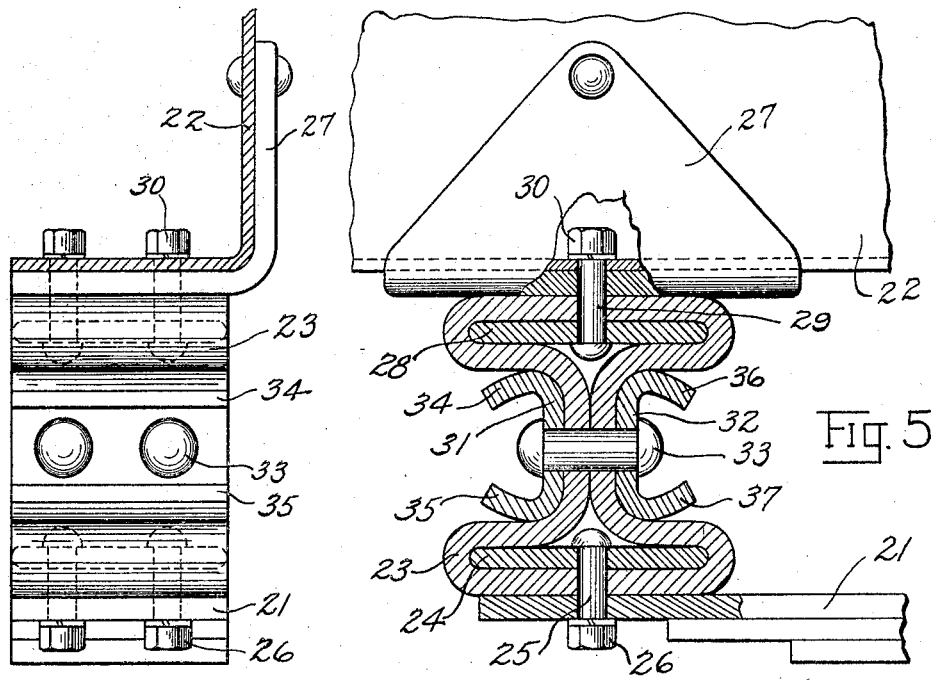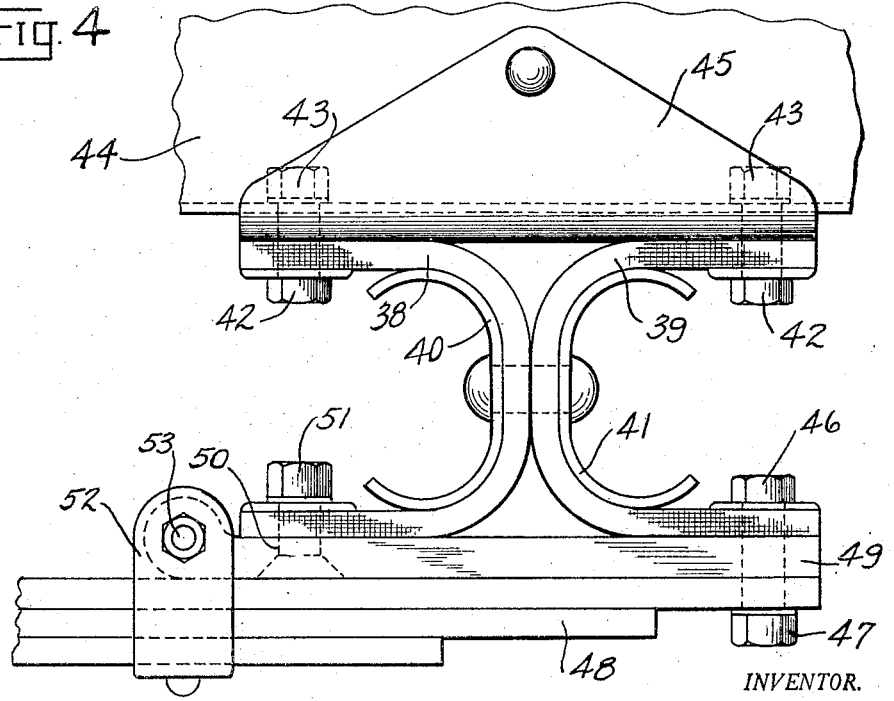

Jan. 24, 1933.  H. W. BELL  1,894,973
FLEXIBLE CONNECTION
Original Filed March 27, 1926    4 Sheets-Sheet 3
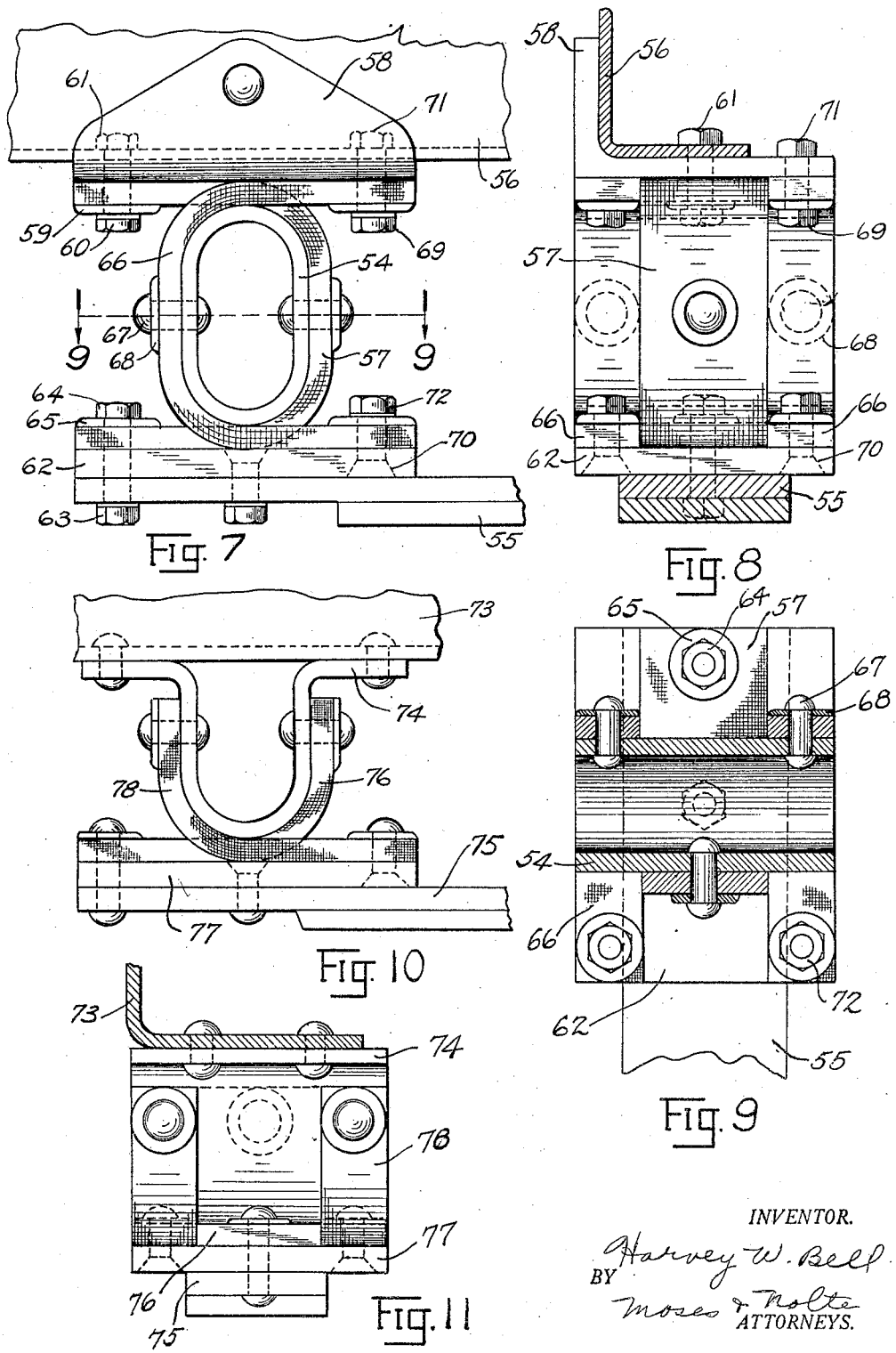
INVENTOR.
Harvey W. Bell
BY Moses & Nolte
ATTORNEYS.

Jan. 24, 1933.  H. W. BELL  1,894,973
FLEXIBLE CONNECTION
Original Filed March 27, 1926   4 Sheets-Sheet 4
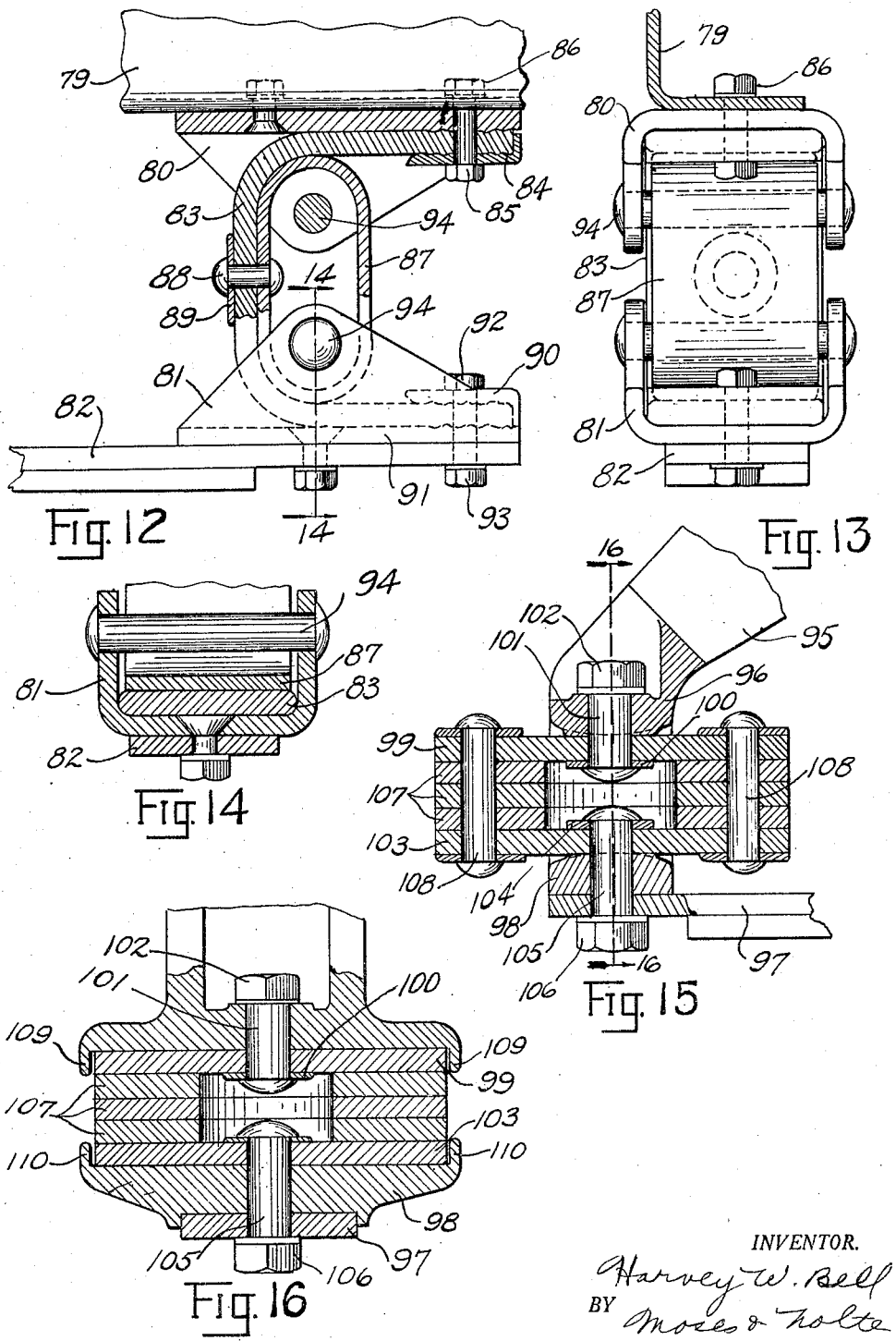
INVENTOR.
Harvey W. Bell
BY Moses & Nolte
ATTORNEYS.

Patented Jan. 24, 1933

1,894,973

UNITED STATES PATENT OFFICE

HARVEY W. BELL, OF ARDSLEY-ON-HUDSON, NEW YORK, ASSIGNOR TO THE BELOYT CORPORATION, OF NEW YORK, N. Y., A CORPORATION OF DELAWARE

FLEXIBLE CONNECTION

Application filed March 27, 1926, Serial No. 97,838. Renewed June 17, 1932.

This invention relates to means for flexibly connecting relatively movable members, such, for example, as the springs and body of an automobile.

It is an object of the invention to provide a compression shackle for supporting the body or sprung parts of the vehicle from the springs, which is capable of permitting pivotal and limited bodily movement of the body relative to the connected spring, but which employs no relatively movable, metallic members in bearing engagement with one another.

It is a further object to provide a shackle which permits relative movement of the body and spring, as described, but which avoids rubbing engagement of relatively movable parts, altogether.

Other objects and advantages will hereinafter appear.

In the drawings:

Figures 4 and 5 are a front elevation and a sectional, side elevation respectively of a further embodiment of the invention;

Figure 6 is a side elevation of still another form of the invention;

Figures 7 and 8 are side and end elevations respectively of a further embodiment;

Figure 9 is a horizontal section on the line 9—9 of Figure 7;

Figures 10 and 11 are a side elevation and an end elevation respectively of still another form of the invention;

Figures 12 and 13 are a side elevation and an end elevation respectively of a further construction embodying features of the invention;

Figure 14 is a detail, front, sectional elevation on the line 14—14 of Figure 12;

Figures 15 and 16 are a section, side elevation and front elevation respectively of another form of the invention; Figure 16 being taken on line 16—16 of Figure 15.

Figure 1:
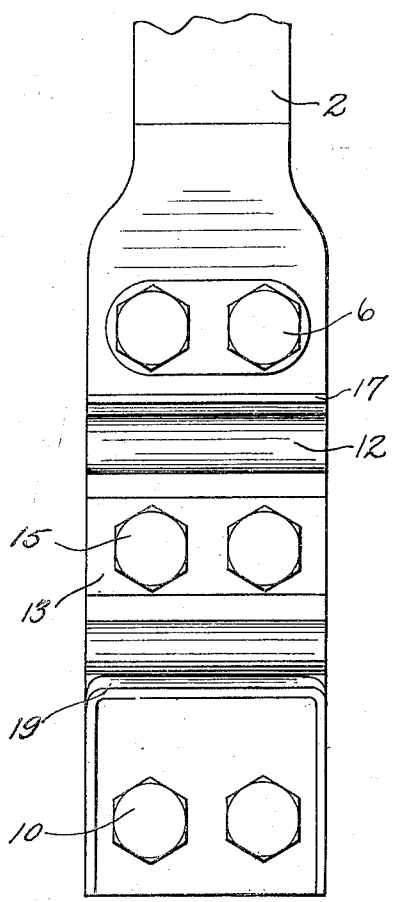
Figure 1 is a fragmentary, front elevation of a motor vehicle, disclosing one form of compression shackle embodying features of the present invention.
Figure 2:
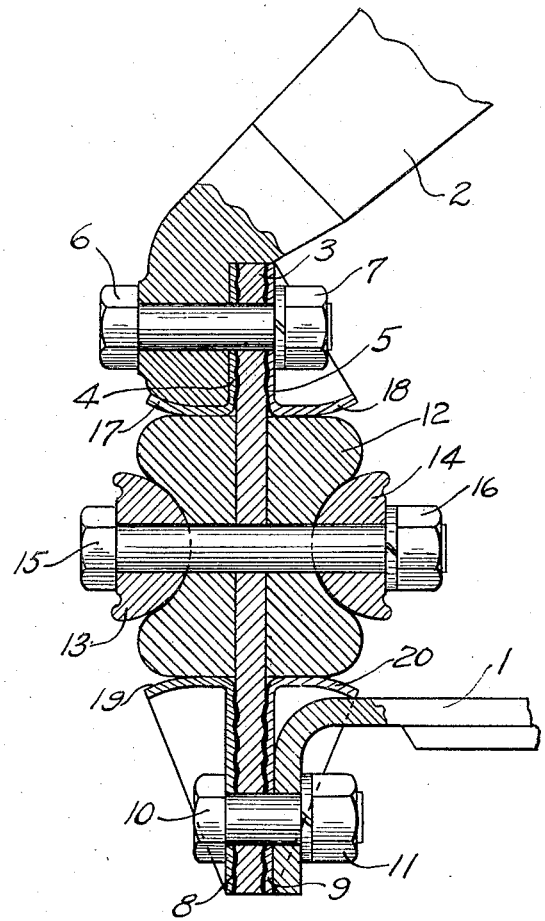
Figure 2 is a sectional, side elevation of the parts disclosed in Figure 1.
Figure 3:
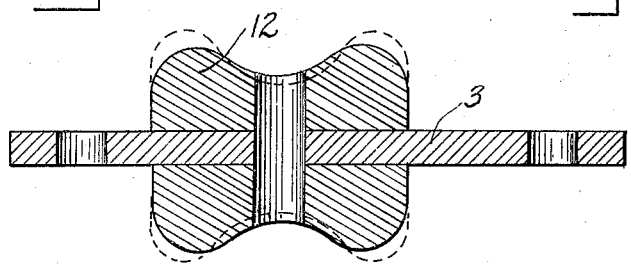
Figure 3 is a section similar to Figure 2 of certain parts shown in Figure 2, illustrating the change effected in a spacer used, by clamping it.

In the embodiment illustrated in Figures 1 to 3 the vehicle body is supported through a compression shackle connected between and joining a vehicle spring 1 and a frame member or bracket 2 of the body. It is a characteristic and novel feature of this shackle that it sustains the vehicle body from the spring under compression, and permits tilting and bodily movement of the spring relatively to the body, yet involves no rubbing engagement of relatively movable parts.

The novel shackle comprises a flexible link or plate 3 of rubberized fabric or other flexible, inelastic, non-metallic material held at its upper end to the frame member 2, between clamping members 4 and 5, by bolts 6, passed through the frame member and through the members 4 and 5, and drawn fast thereto by nuts 7. The link 3 is similarly clamped to a down-turned end of spring 1 between members 8 and 9 by means of bolts 10, passed through said members 8 and 9, and through the spring end, and drawn fast thereto by nuts 11. The clamping faces of the members 4, 5, 8 and 9 are preferably corrugated to provide for securely gripping the fabric. The members 4, 5, 8 and 9 have outturned shoulders between which is interposed a compressible block 12 of rubber or other suitable material forming the compression member of the shackle. This block, when in a normal, unstressed condition, is of the shape shown in full lines in Figure 3. The block is reinforced and compressed at its waist portion between metallic clamping members 13 and 14 by means of bolts 15, passed through said clamping members and through the block 12 and link 3 and drawn fast thereon by nuts 16.

The flexible link or strap 3 constitutes a flexible tension connection between the spring 1 and the frame member 2, limiting relative bodily movement between them. The material of the strap 3 is strongly resistant to flexure in the plane of its body and is of such width that it will effectively prevent side sway of the vehicle when held under tension by the rubber block 12 in the manner described. The weight of the vehicle is sustained, however, by the rubber block 12 acting against shoulders 17, 18, 19 and 20 on the clamping members 4, 5, 8 and 9. It will be seen that these shoulders are rounded so that they permit the rubber block 12 to have a rolling motion upon them. Thus, the displacement of the spring toward the left, with reference to the vehicle frame as viewed in Figure 2, would rock the rubber block about the curved surface of the shoulder 17 and about the curved surface of the shoulder 20. The block would, at the same time, be compressed between the clamping member 13 and the shoulder 17 and between the clamping member 14 and the shoulder 20, the resistance of the block to compression opposing such relative movement of the spring and frame member, and tending to restore the parts to normal position. Displacement of the spring toward the right with relation to the frame member 2, as seen in Figure 2, would cause the block to act in a similar manner with the shoulders 18 and 19.

The shackle is assembled with the rubber not compressed. If the load were put on the shackle in this state, the fabric would have a tendency to buckle. The bolt is drawn up to compress the rubber and separate the frame from the spring, thus putting the fabric under tension so that it is effective to prevent separation of the spring and frame in operation.

It will be seen that this construction provides for pivotal and bodily movement of the spring 1 with relation to the frame member 2 without involving the use of any relatively movable, metallic parts having bearing on one another. This shackle, therefore, requires no lubrication, is not subject to rusting or excessive wear, and will not squeak or rattle in use.

In the form of the invention shown in Figures 4 and 5 a spring 21 is connected to the vehicle frame 22 through another form of compression shackle. This shackle comprises an endless, flexible strap 23 of rubberized fabric or other suitable non-metallic material which is clamped to the spring by means of a clamping plate 24 and bolts 25 passed through the plate 24, strap 23, and spring 21, and drawn fast thereto by nuts 26. The strap 23 is secured at its upper end to the frame member 22 and to an angle brace 27 rigid with said member 22 by means of a clamping plate 28 and bolts 29, passed through the clamping plate 28, the strap 23, the reinforcing bracket 27, and the frame member 22, and drawn fast thereto by nuts 30. The intermediate stretches of the strap 23 are drawn together into contact between C-shaped bearing members 31 and 32 which are held together back to back by suitable connecting means, such as rivets 33. The member 31 has upper and lower curved ends 34 and 35 and the member 32 has upper and lower curved ends 36 and 37 for cooperation with the strap 23. When the spring moves toward the left with relation to the body, as seen in Figure 5, the strap is drawn taut about surfaces 34 and 37, and when the spring is displaced in the opposite direction, the strap is drawn taut about the surfaces 35 and 36. It will thus be seen that limited, relative movement is permitted in either direction.

In the form of the invention shown in Figure 6, straps 38 and 39 are passed around C-shaped clamping and bearing members 40 and 41 respectively, and are connected at their upper ends by bolts 42 and nuts 43 to a frame member 44 and to a reinforcing bracket 45 secured to the frame member. The strap 39 at its lower end is secured by bolt 46 and nut 47 to a spring 48 and connector plate 49. The strap 38 at its lower end is connected by bolt 50 and nut 51 to connector plate 49. The connector plate 49 is secured at its forward end to the spring 48 through a clamping yoke 52 that embraces the spring, a bolt 53 being passed through aligned openings in the yoke and through an eye in the end of the plate.

The operation of this form of the invention is similar in principle to that of the form disclosed in Figures 4 and 5 and need not be explained in detail.

In the form disclosed in Figures 7 and 8 a central compression spacer tube or block 54 is interposed between the spring 55 and body member 56. A strap 57 is secured at its middle to this metallic compression block 54 as by riveting, and is clamped at its upper ends to the frame member 56 and to a bracket 58 reinforcing the frame member, by a clamping washer or plate 59, bolt 60 and nut 61. The strap 57 is clamped at its lower end to the spring 55 and to a connector plate 62 by a bolt 63, nut 64 and clamping washer or plate 65. At opposite sides of the strap 57 other straps 66 are lead around the compression block 54, these being clamped at their middles to the block 54 by suitable means, such as rivets 67 and clamping plates 68. These straps are clamped at their upper and lower ends to the vehicle frame and the connector plate 62 respectively by bolts 69 and 70 and nuts 71 and 72.

It will be seen that relative movement of the spring and frame member tending to rock the compression member 54 will be permitted to a limited extent, due to the curved form of the compression member 54 and the fact that the straps are slightly extensible.

In the form of the invention shown in Figures 9 to 11 the body member 73 is provided with a U-shaped, metallic bracket or compression member 74, which dips downward toward the spring 75. A strap 76 is riveted to one side of the bracket 74 and is secured at its lower end to a connector plate 77 and spring 75. Similar straps 78 are riveted to the opposite side of the bracket 74 and are secured at their lower ends to the connector plate 77 by suitable means, as rivets or bolts.

In the form of the invention shown in Figures 12 to 14 the frame member 79 has a yoke 80 depending therefrom. A similar yoke 81 rises from the spring 82. A strap 83 is clamped at its upper ends between a clamping plate 84 and the yoke 80 by means of a bolt 85, passed through the plate 84, strap 83, yoke 80 and frame member 79, and held fast thereto by nut 86. This strap is passed around a compression tube or block 87, being secured at its middle to said block by a rivet 88 and clamping plate or washer 89. At its lower end the strap 83 is clamped between a clamping plate 90 and connector plate 91 by means of a bolt 92, passed through the spring 82, connector plate 91, strap 83 and clamping plate 90, and held thereto by a nut 93. In this form of the invention the compression member 87 is free to move to a substantial extent with relation to the other parts, and hence permits considerable freedom of relative motion between the spring and the body. For the purpose of limiting movement of the member 87 and of maintaining the parts operatively associated, pins 94 are passed through the yokes 80 and 81 to lie within the compression member 87. These pins, however, are normally out of contact with the member 87 and are designed to act simply as limiting means to prevent movement of the shackle parts beyond a pre-determined position, particularly in rebound.

In the form of the invention shown in Figures 15 and 16 the frame member 95 is provided with a bearing member 96, having a curved bearing surface which rests upon the novel compression shackle disclosed. The spring 97 is provided with a similar bearing member 98, having a curved bearing surface upon which the compression shackle rests. The shackle itself consists of a multiplicity of plies or laminæ of non-metallic material, such as rubberized fabric. The upper ply 99 of the shackle is secured to the member 96 by means of a clamping plate 100, bolt 101 and nut 102. The lower ply 103 of the shackle is similarly secured to the spring 97 by means of a clamping plate 104, bolt 105 and nut 106. The intermediate plies 107 of the shackle are connected with the outer plies 99 and 103 by rivets 108. These intermediate plies 107 are cut away within the body to permit the inner ends of the bolts 101 and 105 to move freely. With this form of construction a relative rocking of limited extent is permitted between the spring 97 and frame member 95 and a greater relative movement of these members toward and from one another is permitted than in the other embodiments of the invention. The plies 99, 107 and 103 could be vulcanized together with bolts 101 and 105 in place.

Ears 109 and 110 on the bearing members 96 and 98 limit side play of the plies 99 and 103, thus relieving these plies of strain at the bolt holes, and avoiding wear.

It is a feature common to all the embodiments of the invention disclosed herein that the relatively movable parts engage one another with a simple rocking or rolling action and without any rubbing whatever. This is a very important point in a construction of this kind, because it avoids squeaking, obviates wear, and eliminates all necessity for lubrication.

Variations may be resorted to within the scope of the invention and parts of the improvements may be used without others.

What I claim is:

1. In combination, a supporting member, a supported member, and a flexible shackle comprising a distortable spacer, and means for adjusting the dimensions of the spacer.

2. In a vehicle, a spring, a body member supported therefrom, and means flexibly coupling the spring and the body member, comprising a flexible non-metallic link, clamping members secured to the upper end of the link and to the body member, clamping members secured to the lower end of the link and to the spring, and a compressible spacer interposed between the spring-connected and body-connected clamping members, said clamping members having rounded faces directed toward the spacer to provide for rolling engagement therewith.

3. In a vehicle, a spring, a body member, and a vehicle shackle constructed and arranged to permit relative rocking and bodily movement of the spring and the body member comprising a compressible spacer arranged to rock between the spring and the body member.

4. In combination, a supporting member, a supported member, and a flexible shackle coupling said members, said shackle comprising flexible non-metallic tension means holding the members against separation, an adjustable spacer interposed between the members, and means for adjusting the spacer to maintain the tension means taut and thereby prevent uncontrolled relative movement of the members.

5. In combination, a supporting member, a supported member, a distortable spacer interposed between said members taking the normal load, flexible non-metallic tension means connecting the members to limit separation thereof, and means for distorting the spacer and maintaining it in a distorted condition to separate said members for causing the tension means to be maintained in a distended condition.

In testimony whereof I have affixed my signature to this specification.

HARVEY W. BELL.